United States Patent
Sugizaki

(10) Patent No.: US 7,437,461 B2
(45) Date of Patent: Oct. 14, 2008

(54) LOAD BALANCING APPARATUS AND METHOD

(75) Inventor: Atsuya Sugizaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 644 days.

(21) Appl. No.: 10/945,204

(22) Filed: Sep. 20, 2004

(65) Prior Publication Data
US 2005/0267970 A1  Dec. 1, 2005

(30) Foreign Application Priority Data
May 11, 2004   (JP)  ............................. 2004-140662

(51) Int. Cl.
*G06F 15/173*  (2006.01)
(52) U.S. Cl. ..................................... 709/226
(58) Field of Classification Search .............. 709/105, 709/104, 223
See application file for complete search history.

(56) References Cited

U.S. PATENT DOCUMENTS

| | | | |
|---|---|---|---|
| 6,101,508 A * | 8/2000 | Wolff | 709/223 |
| 6,175,874 B1 | 1/2001 | Imai et al. | |
| 6,438,652 B1 * | 8/2002 | Jordan et al. | 711/120 |
| 6,574,229 B1 | 6/2003 | Takahashi et al. | |
| 6,611,873 B1 | 8/2003 | Kanehara | |
| 6,801,949 B1 * | 10/2004 | Bruck et al. | 709/232 |
| 6,880,156 B1 * | 4/2005 | Landherr et al. | 718/105 |
| 2003/0172163 A1 | 9/2003 | Fujitsu et al. | |

FOREIGN PATENT DOCUMENTS

| | | |
|---|---|---|
| JP | 06-274432 | 9/1994 |
| JP | 7-240756 | 9/1995 |
| JP | 09-218842 | 8/1997 |
| JP | 2002-183106 | 6/2002 |
| JP | 2002-342296 | 11/2002 |
| JP | 2002-351760 | 12/2002 |
| JP | 2002-374290 | 12/2002 |
| JP | 2003-281007 | 10/2003 |

* cited by examiner

*Primary Examiner*—David Y Eng
(74) *Attorney, Agent, or Firm*—Greer, Burns & Crain, Ltd.

(57) ABSTRACT

An object of this invention is to suppress influence due to a server trouble. This load balancing method comprises: if it is detected that a trouble occurred in a first server included in plural servers, selecting a second server other than the first server from the plural servers as a new transfer destination of a processing request from a user terminal whose transfer destination of the processing request is set to the first server; and generating and storing into a connection management data storage, setting data to transfer the processing request from the user terminal whose transfer destination of the processing request is set to the first server to the second server via a transfer route determined based on a predetermined rule. Thus, the processing request from the user terminal associated with the first server in which the trouble occurred is transferred to another normal second server, appropriately.

12 Claims, 8 Drawing Sheets

| USER TERMINAL SIDE | | | | SERVER SIDE | | | |
|---|---|---|---|---|---|---|---|
| USER TERMINAL | | LOAD BALANCING APPARATUS | | LOAD BALANCING APPARATUS | | SERVER | |
| IP[T3] | PORT[T3] | Xs | Xp | IP[X1] | PORT[X1] | IP[S51] | PORT[S51] |
| IP[T7] | PORT[T7] | Xs | Xp | IP[X2] | PORT[X2] | IP[S51] | PORT[S51] |
| IP[T9] | PORT[T9] | Xs | Xp | IP[X3] | PORT[X3] | IP[S53] | PORT[S53] |
| IP[T11] | PORT[T11] | Xs | Xp | IP[X4] | PORT[X4] | IP[S55] | PORT[S55] |

| USER TERMINAL SIDE | | | | SERVER SIDE | | | |
|---|---|---|---|---|---|---|---|
| USER TERMINAL | | LOAD BALANCING APPARATUS | | LOAD BALANCING APPARATUS | | SERVER | |
| IP[T9] | PORT[T9] | Xs | Xp | IP[X3] | PORT[X3] | IP[S53] | PORT[S53] |
| IP[T11] | PORT[T11] | Xs | Xp | IP[X4] | PORT[X4] | IP[S55] | PORT[S55] |

FIG.3B

| USER TERMINAL SIDE | | | | SERVER SIDE | | | |
|---|---|---|---|---|---|---|---|
| USER TERMINAL | | LOAD BALANCING APPARATUS | | LOAD BALANCING APPARATUS | | SERVER | |
| IP[T3] | PORT[T3] | Xs | Xp | IP[X5] | PORT[X5] | IP[S53] | PORT[S53] |
| IP[T7] | PORT[T7] | Xs | Xp | IP[X6] | PORT[X6] | IP[S55] | PORT[S55] |
| IP[T9] | PORT[T9] | Xs | Xp | IP[X3] | PORT[X3] | IP[S53] | PORT[S53] |
| IP[T11] | PORT[T11] | Xs | Xp | IP[X4] | PORT[X4] | IP[S55] | PORT[S55] |

FIG.3C

| USER TERMINAL SIDE | | | | SERVER SIDE | | | |
|---|---|---|---|---|---|---|---|
| USER TERMINAL | | LOAD BALANCING APPARATUS | | LOAD BALANCING APPARATUS | | SERVER | |
| IP[T3] | PORT[T3] | Xs | Xp | IP[X3] | PORT[X3] | IP[S53] | PORT[S53] |
| IP[T7] | PORT[T7] | Xs | Xp | IP[X4] | PORT[X4] | IP[S55] | PORT[S55] |
| IP[T9] | PORT[T9] | Xs | Xp | IP[X3] | PORT[X3] | IP[S53] | PORT[S53] |
| IP[T11] | PORT[T11] | Xs | Xp | IP[X4] | PORT[X4] | IP[S55] | PORT[S55] |

FIG.3D

| USER TERMINAL SIDE | | | | SERVER SIDE | | | |
|---|---|---|---|---|---|---|---|
| USER TERMINAL | | LOAD BALANCING APPARATUS | | LOAD BALANCING APPARATUS | | SERVER | |
| IP[T3] | PORT[T3] | Xs | Xp | IP[X1] | PORT[X1] | IP[S51] | PORT[S51] |
| IP[T7] | PORT[T7] | Xs | Xp | IP[X2] | PORT[X2] | IP[S51] | PORT[S51] |
| IP[T9] | PORT[T9] | Xs | Xp | IP[X3] | PORT[X3] | IP[S53] | PORT[S53] |
| IP[T11] | PORT[T11] | Xs | Xp | IP[X4] | PORT[X4] | IP[S55] | PORT[S55] |
| | | | | IP[X5] | PORT[X5] | IP[S53] | PORT[S53] |
| | | | | IP[X6] | PORT[X6] | IP[S55] | PORT[S55] |
| | | | | IP[X7] | PORT[X7] | IP[S53] | PORT[S53] |
| | | | | IP[X8] | PORT[X8] | IP[S55] | PORT[S55] |

FIG.3E

| USER TERMINAL SIDE | | | | SERVER SIDE | | | |
|---|---|---|---|---|---|---|---|
| USER TERMINAL | | LOAD BALANCING APPARATUS | | LOAD BALANCING APPARATUS | | SERVER | |
| IP[T3] | PORT[T3] | Xs | Xp | IP[X5] | PORT[X5] | IP[S53] | PORT[S53] |
| IP[T7] | PORT[T7] | Xs | Xp | IP[X6] | PORT[X6] | IP[S55] | PORT[S55] |
| IP[T9] | PORT[T9] | Xs | Xp | IP[X3] | PORT[X3] | IP[S53] | PORT[S53] |
| IP[T11] | PORT[T11] | Xs | Xp | IP[X4] | PORT[X4] | IP[S55] | PORT[S55] |
| | | | | IP[X7] | PORT[X7] | IP[S53] | PORT[S53] |
| | | | | IP[X8] | PORT[X8] | IP[S55] | PORT[S55] |

FIG.3F

LOAD BALANCING APPARATUS AND METHOD

TECHNICAL FIELD OF THE INVENTION

This invention relates to a load balancing processing technique.

BACKGROUND OF THE INVENTION

In general, in a system using a server load balancing apparatus (hereinafter, simply called as a load balancing apparatus), connections from user terminals such as personal computers and cellular phones are terminated at the load balancing apparatus, and an appropriate server to which a job for the user terminal is assigned is selected based on load states of the servers and the like to distribute the loads among the servers. At that time, the load balancing apparatus associates the connection with the user terminal side with the connection with the server side, individually, and holds the correspondence data. When receiving request data from user terminal, it transfers the received request data to the server associated with the source user terminal. On the other hand, when receiving response data from the server, it transfers the received response data to the user terminal associated with the source server.

In addition, because it monitors the state of the server, if it detects any trouble in a server at the time of establishing the connection with the user terminal, the server excluded objects of the load balancing. On the other hand, in a case where any trouble occurs in a server in a state in which the connection with the user terminal is already established, the connection with the user terminal side associated with the server is disconnected. Thus, in the user terminal associated with the server in which any trouble occurs, the communication error occurs, and for example, even if a series of jobs were progressed halfway, it is necessary to carry out the jobs again from the beginning.

For example, JP-A-07-240756 discloses a technique in which even if any trouble occurs in a specific communication path, the connection is maintained by using an alternative path. That is, in a case where a connection is established by a path a between a system A and a system B, when the system A detects any trouble in the path a, it transmits a path change request to the system B via a path b. When the system B can use the pass b, it replies a path change confirmation to the system A via the path b. If the transmission path of the path change request is the same as the reception path of the path change confirmation, the system A transmits the pass change confirmation to the system B via the path b. As a result, the connection is maintained by the path b.

However, in the system using the load balancing apparatus, the communication between the user terminal and the server is carried out without recognition of opponent addresses each other. Therefore, it is difficult to simply apply the aforementioned technique to the system using the load balancing apparatus. In addition, in the system using the load balancing apparatus, it is also not appropriate to set an alternative path for each connection between the server and the user terminal in advance.

SUMMARY OF THE INVENTION

Therefore, an object of this invention is to provide a technique associated with the load balancing apparatus to suppress the influence due to the server trouble.

A load balancing method according to this invention is a load balancing method for transferring a processing request from a user terminal to either of a plurality of servers, which comprises: if it is detected that a trouble occurred in a first server included in the plurality of servers, selecting a second server other than the first server from the plurality of servers as a new transfer destination of the processing request from a user terminal whose transfer destination of the processing request is set to the first server; and generating and storing into a connection management data storage, setting data to transfer the processing request from the user terminal whose transfer destination of the processing request is set to the first server, to the second server via a transfer route determined based on a predetermined rule.

As a result, the processing request from the user terminal associated with the first server in which any trouble occurred is transferred to another normal second server. For example, if information concerning the processing state is shared between the first and second servers, even if the server is switched halfway during a series of processings, the processings can be continuously progressed. That is, the influence due to the server trouble can be suppressed.

In addition, the aforementioned transfer route may be a new connection to the second server. That is, it is possible to establish a new connection to the second server from the load balancing apparatus, and to transfer the processing request from the user terminal to the second server.

In addition, the aforementioned transfer route may be a connection to, which is an already established and being used connection to the second server. That is, it is possible to use a connection from the load balancing apparatus to the second server, which is already established and being used, and to transfer the processing request from the user terminal to the second server. Incidentally, it is also possible to use a connection from the load balancing apparatus to the second server, which is already established and is not used, and to transfer the processing request from the user terminal to the second server.

In addition, the load balancing method according to this invention may further comprise: judging load states of the plurality of servers, and the aforementioned predetermined rule may be a rule to determine as the transfer route, a first connection to the second server, which is already established and being used, in a case where it is judged that a load of the second server is higher than a predetermined reference, to determine as the transfer route, a second connection to the second server, which is already established and is not used, in a case where it is judged that the load of the second server is equal to or lower than the predetermined reference and the second connection exists, and to determine as the transfer route, a new connection to the second server, in a case where it is judged that the load of the second server is equal to or lower than the predetermined reference and there are only connections being used in connections to the second server, which are already established.

Thus, a connection resetting method is appropriately selected. That is, in a case where the load of the second server is higher than the predetermined reference, because it is not appropriate to increase the number of connections used, the connection, which is already established and being used, is utilized. In addition, in a case where the load of the second server is equal to or lower than the predetermined reference, a free connection to the second server, which is already established and is not used, is utilized if such a free connection exists, and if such a free connection does not exist, a new connection is utilized. As a result, the server resources can be appropriately utilized.

Incidentally, a program for causing a processor to execute the method according to this invention can be created, and a load balancing apparatus is configured by an apparatus including the processor and the program. In addition, the program is stored in a storage medium or storage device, such as a flexible disk, CD-ROM, magneto-optic disk, semiconductor memory, and hard disk. Furthermore, it may be distributed as digital signals via a network. Incidentally, intermediate processing data is temporality stored in a storage device, such as a memory.

BRIEF DESCRIPTION OF THE DRAWINGS

FIG. 3A is a first diagram showing an example of a configuration of a connection management table and stored data;

FIG. 3B is a second diagram showing an example of the configuration of the connection management table and stored data;

FIG. 3C is a third diagram showing an example of the configuration of the connection management table and stored data;

FIG. 3D is a fourth diagram showing an example of the configuration of the connection management table and stored data;

FIG. 3E is a fifth diagram showing an example of the configuration of the connection management table and stored data;

FIG. 3F is a sixth diagram showing an example of the configuration of the connection management table and stored data;

DETAILED DESCRIPTION OF THE PREFERRED EMBODIMENTS

Figure 1:
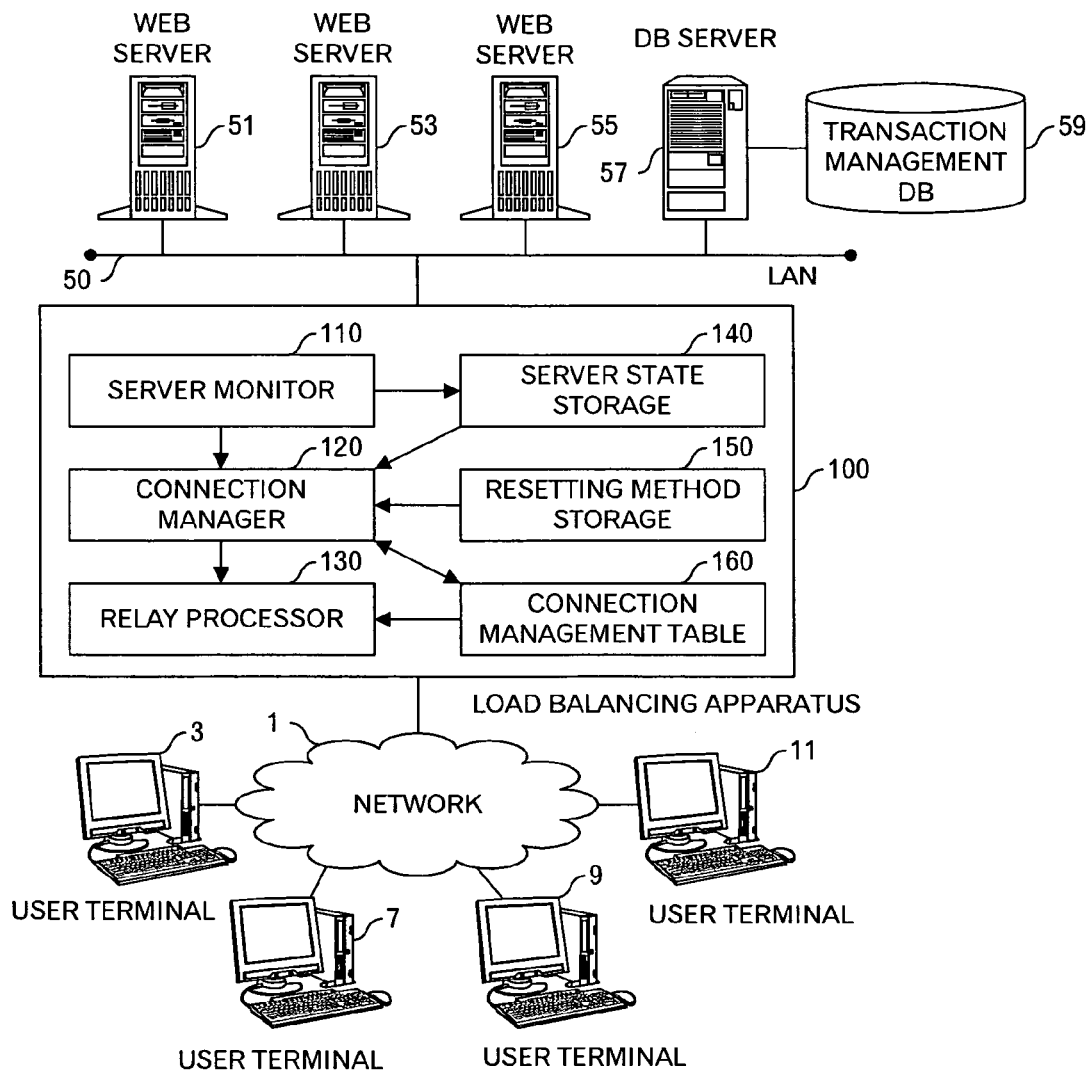
FIG. 1 is a system configuration diagram in an embodiment of this invention.

FIG. 1 shows a system configuration according to an embodiment of this invention. For example, a network 1 such as the Internet connects a load balancing apparatus 100, and user terminals 3, 7, 9, and 11, which are personal computers including a Web browser function, for example, by the wire or wireless. Incidentally, the number of user terminals is not limited to four, as shown in here. In addition, the user terminal may be a device other than the personal computer, such as a personal digital assistant (PDA), cellular phone, which include the Web browser function, or the like.

The load balancing apparatus 100 is connected with not only the network 1, but also a Local Area Network (LAN) 50 in a server center by the wire or wireless. The LAN 50 connects Web servers 51, 53, and 55, and database (DB) server 57 in addition to the load balancing apparatus 100 by the wire or wireless. Incidentally, the number of Web servers is not limited to three, as shown here. In addition, a transaction management DB 59 is connected with the DB server 57. The transaction management DB 59 stores data concerning processings carried out by each Web server, and can be accessed by each Web server.

The load balancing apparatus 100 includes a server monitor 110, connection manager 120, relay processor 130, server state storage 140, resetting method storage 150, and connection management table 160. The server monitor 110 carries out state checks for the Web servers 51, 53 and 55 at predetermined intervals, or an arbitrary timing, and stores the check results into the server state storage 140. Incidentally, the state check includes not only a check to determine normal or abnormal, but also a check of the load state for each Web server. In addition, when any trouble is detected in any Web server, the server monitor 110 outputs data (e.g. IP address) concerning the Web server in which any trouble is detected.

The connection manager 120 refers to the server state storage 140, resetting method storage 150, connection management table 160, carries out a processing to associate a user terminal with a Web server, and stores data of the processing result into the connection management table 160. The resetting method storage 150 stores a connection resetting method in a case where the connection resetting method in a processing after the server trouble is detected is already determined. In a case where data is not registered in the resetting method storage 150, the connection manager 120 selects a connection resetting method. In this embodiment, the connection resetting method is selected from three kinds of methods, for example. The respective connection resetting methods will be explained in detail later. In addition, when the connection manager 120 receives processing request data from the user terminal, it registers data into the connection management table 160 if necessary, and outputs data to instruct the relay processor 130 to start a processing.

The relay processor 130 refers to the connection management table 160 to carry out the relay processing of the data. That is, the processing request data from a user terminal (which is either of the user terminals 3, 7, 9 and 11) is transferred to a Web server (which is either of the Web servers 51, 53 and 55) specified according to the data stored in the connection management table 160. In addition, response data from a Web server (which is either of the Web servers 51, 53 and 55) is transferred to a user terminal (which is either of the user terminals 3, 7, 9 and 11) specified according to the data stored in the connection management table 160.

Incidentally, in a case where plural user terminals are associated with one Web server, according to the First In First Out (FIFO) method, the response data from the Web server is relayed to a user terminal specified according to an order in which the processing request was received. Because the processing order in the Hyper Text Transfer Protocol (HTTP) is ensured, the correct relay processing can be performed by this configuration. For example, in a case where the user terminals 3 and 7 are associated with the Web server 51, when the relay processor 130 receives processing requests from first, the user terminal 3, and next, the user terminal 7 in such a order, firstly it transfers the processing request from the user terminal 3 to the Web server 51, and next transfers the processing request from the user terminal 7 to the Web server 51. As a result, the Web server 51 firstly transmits response data corresponding to the processing request from the user terminal 3, and next transmits response data corresponding to the processing request from the user terminal 7. Thus, if the relay processor 130 transfers the response data, which is received firstly, to the user terminal 3, and next transfers the response data, which is received next, to the user terminal 7, an appropriate transfer processing can be carried out. Incidentally, there is a case where a management table to hold the order is used. In addition, the destination user terminal may be determined from contents of transferred data (e.g. header data).

Figure 2A:
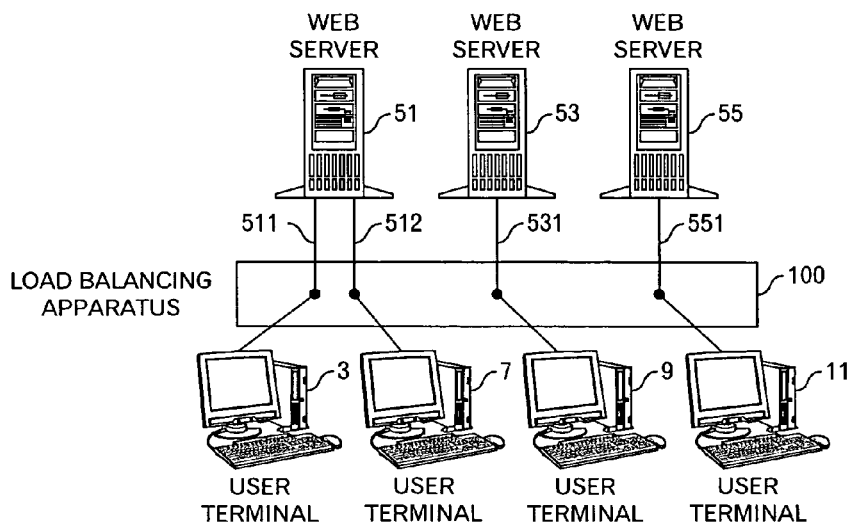
FIG. 2A is a first connection conceptual diagram.

FIG. 2A shows the first connection conceptual diagram. Incidentally, as for the same elements as in FIG. 1, the same reference symbols are affixed. FIG. 2A shows a state in which a connection 511 from the load balancing apparatus 100 to the Web server 51 is associated with a connection from the user terminal 3, and a connection 512 is associated with a connection from the user terminal 7. Similarly, it shows a state in which a connection 531 from the load balancing apparatus 100 to the Web server 53 is associated with a connection from the user terminal 9, and a connection from the load balancing apparatus 100 to the Web server 55 is associated with a connection from the user terminal 11.

In such a state, the connection management table 160 stores data as shown in FIG. 3A, for example. A table as shown in FIG. 3A includes a column 300 of user terminal IP addresses, column 302 of user terminal port numbers, column 304 of first addresses of the load balancing apparatus, column 306 of first port numbers of the load balancing apparatus, column 308 of second addresses of the load balancing apparatus, column 310 of second port numbers of the load balancing apparatus, column 312 of server IP addresses, and column 314 of server port numbers. Incidentally, the first address and first port number mean an IP address and port number laid open to the user terminals in the load balancing apparatus 100. In addition, the second address and second port number mean an IP address and port number laid open to the Web servers in the load balancing apparatus 100. In an example of FIG. 3A, although different IP addresses are registered in respective rows of the column 308 of the second IP addresses of the load balancing apparatus, because the identification of connections is possible by using the port number (i.e. value of the column 310 of the second port numbers of the load balancing apparatus), the same IP address may be registered in each rows in the column 308 of the second addresses of the load balancing apparatus. In addition, the IP address commonly used may not be registered in the connection management table 160, but managed separately in another data storage.

The load balancing apparatus 100 has an IP address of "Xs" as if plural Web servers look one server from the user terminals. The respective user terminals transmit, for example, a processing request to one IP address of this "Xs". The connection manager 120 of the load balancing apparatus 100 selects an appropriate Web server according to, for example, the load states of the Web servers, associates the connection of the user terminal side with the connection of the Web server side, and registers data as shown in FIG. 3A. That is, although the respective user terminals carry out communication by using one destination IP address of "Xs", actually, processings requested from the user terminals 3 and 7 are carried out by the Web server 51, processings requested from the user terminal 9 are carried out by the Web server 53, and processings requested from the user terminal 11 is carried out by the Web server 55, and accordingly, the load balancing is achieved (See FIG. 2A). Incidentally, as for the selection method of the Web server in the load balancing, there are various methods using such as a round robin, least number of connections, least number of clients, least volume of data communication, least response time, least CPU load ratio, least memory usage ratio, least disk load ratio, but any method can be used. In addition, because such load balancing itself is a mere conventional art, the detailed explanation is omitted.

Further, the port number of "Xp" is assigned to the communication port at the user terminal side of the load balancing apparatus 100. In the communication via the Internet, the actual data transmission and reception are carried out in a socket unit combining the IP address and port. That is, the load balancing apparatus 100 uses the common IP address and port number in the communication with any of the user terminals.

Figure 2B:
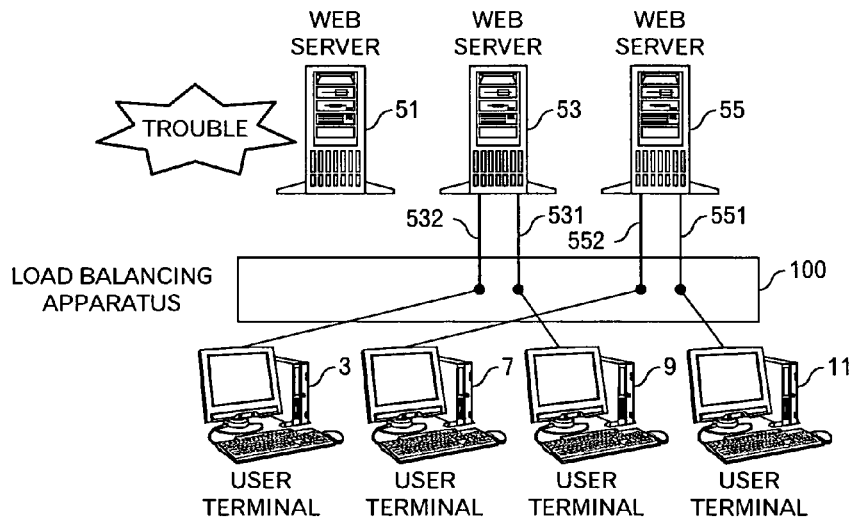
FIG. 2B is a second connection conceptual diagram.

FIG. 2B shows the second connection conceptual diagram. FIG. 2B shows a connection conceptual diagram in a case where any trouble is detected in the Web server 51 in the connection state as shown in FIG. 2A and the server side connection is reset. Incidentally, as for the same elements as in FIG. 2A, the same reference symbols are affixed.

FIG. 2B shows a state in which a new connection 532 from the load balancing apparatus 100 to the Web server 53 is associated with a connection from the user terminal 3, and a new connection 552 from the load balancing apparatus 100 to the Web server 55 is associated with a connection from the user terminal 7. Incidentally, data for the connections 511 and 512 shown in FIG. 2A disappears because the trouble occurs in the Web server 51. Thus, by associating the connections from the user terminals 3 and 7, which were associated with the Web server 51 in which the trouble is detected, with connections to other Web servers, it becomes possible not to affect the user terminals any influence due to the server trouble.

Incidentally, because such an associating processing is not carried out in any conventional art, the user terminals 3 and 7, which were associated with the Web server 51 in which the trouble was detected, cannot continuously carry out a series of processings, for example. That is, because data stored in the connection management table 160 is updated as shown in FIG. 3B, the user terminals 3 and 7 are handled as new user terminals requesting a new job. Incidentally, of FIG. 3B, the first and second rows of FIG. 3A, that is, records for the user terminals 3 and 7 are deleted.

On the other hand, in a case of a state as shown in FIG. 2B, data as shown in FIG. 3C, for example, is stored in the connection management table 160. That is, the bold frame portion is automatically updated from the state shown in FIG. 3A, and the records for the user terminals 3 and 7 are not deleted. As for updated contents, new values are registered in the column 308 of the second addresses of the load balancing apparatus, and the column 310 of the second port numbers of the load balancing apparatus, and in the column 312 of the server IP address, and column 314 of the server port number, the IP address and port number of the Web server 53 is registered in the first row, and the IP address and the port number of the Web server 55 is registered in the second row. That the new values are registered in the column 308 of the second addresses of the load balancing apparatus and column 310 of the second port numbers of the load balancing apparatus means that new connections 532 and 552 are established in FIG. 2B.

Figure 2C:
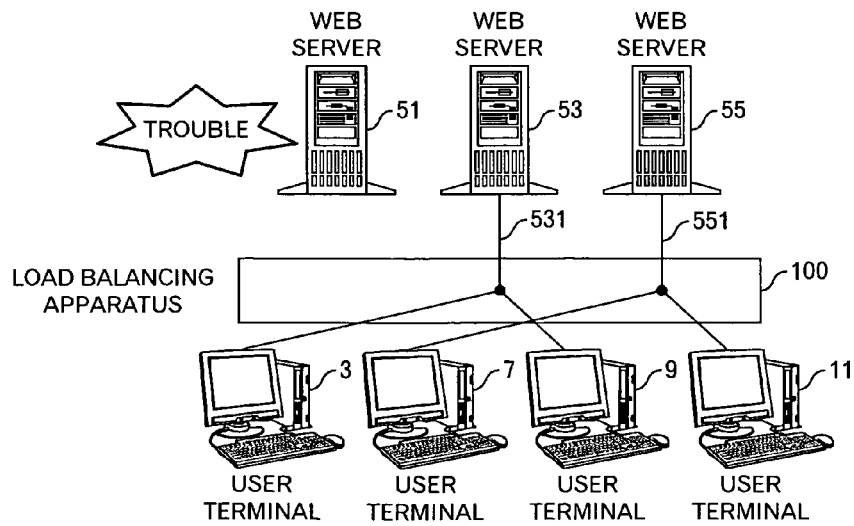
FIG. 2C is a third connection conceptual diagram.

FIG. 2C shows the third connection conceptual diagram. FIG. 2C shows the connection conceptual diagram in a case where in the connection state as shown in FIG. 2A, any trouble is detected in the Web server 51, and the connections of the server side are reset. Incidentally, as for the same elements as in FIG. 2A, the same reference symbols are affixed.

FIG. 2C shows a state in which the existing connection 531 from the load balancing apparatus 100 to the Web server 53 is associated with a connection from the user terminal 3, and the existing connection 551 from the load balancing apparatus 100 to the Web server 55 is associated with a connection from the user terminal 7. Incidentally, data for the connections 511 and 512 disappears because the trouble occurs in the Web server 51. Thus, by associating the connections from the user terminals 3 and 7, which are associated with the Web server 51 in which the trouble is detected, with connections to other Web servers, which are already established and being used, it becomes possible not to affect the user terminals any influence due to the server trouble.

In a case of a state as shown in FIG. 2C, data as shown in FIG. 3D is stored in the connection management table 160. That is, the bold frame portion is automatically updated from FIG. 3A, and records for the user terminals 3 and 7 are not deleted. As for updated contents, the same data as in the third line is registered in the first line, and the same data as in the fourth line is registered in the second line. The record in the third line is a record for the user terminal 9, and that the same data as in the third data is registered in the record of the first line for the user terminal 3 means that the user terminal 3 is associated with the same connection as the connection associated with the user terminal 9. Similarly, updated contents in the second line shows that the user terminal 7 is associated with the same connection as the connection associated with the user terminal 11.

Figure 2D:
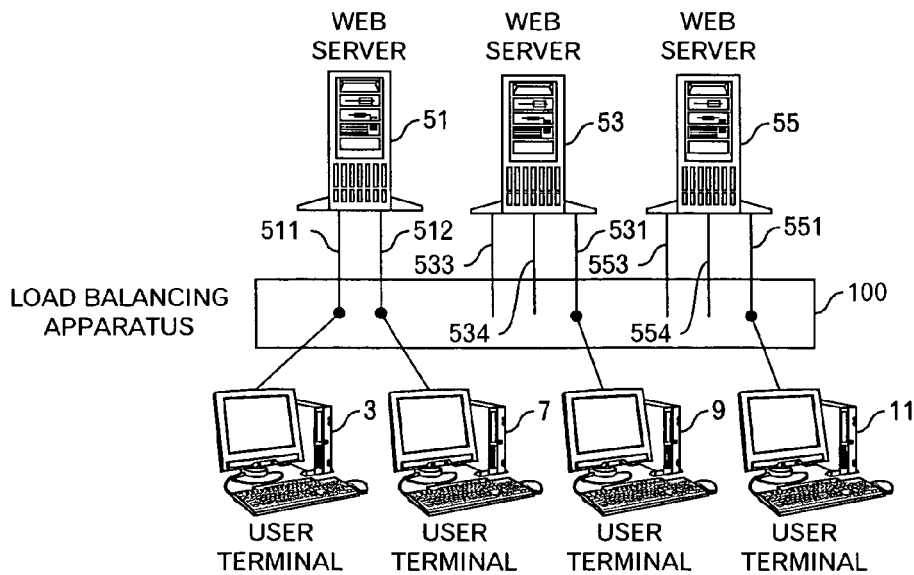
FIG. 2D is a fourth connection conceptual diagram.

FIG. 2D shows the fourth connection conceptual diagram. Incidentally, as for the same elements as in FIG. 2A, the same symbols are affixed. FIG. 2D shows a state in which a connection from the user terminal 3 is associated with the connection 511 from the load balancing apparatus 100 to the Web server 51, and a connection from the user terminal 7 is associated with the connection 512. Similarly, it shows the state in which a connection from the user terminal 9 is associated with the connection 531 from the load balancing apparatus 100 to the Web server 53, and a connection from the user terminal 11 is associated with the connection 551 from the load balancing apparatus 100 to the Web server 55. In addition, it shows the state in which unused connections 533 and 534 to the Web server 53 and unused connections 553 and 554 to the Web server 55 are already established.

In a case of such a state, data as shown in FIG. 3E is stored in the connection management table 160, for example. Records from the fifth line to eighth line are data corresponding to the connections 533, 553, 534, and 554 in sequence, for example.

Figure 2E:
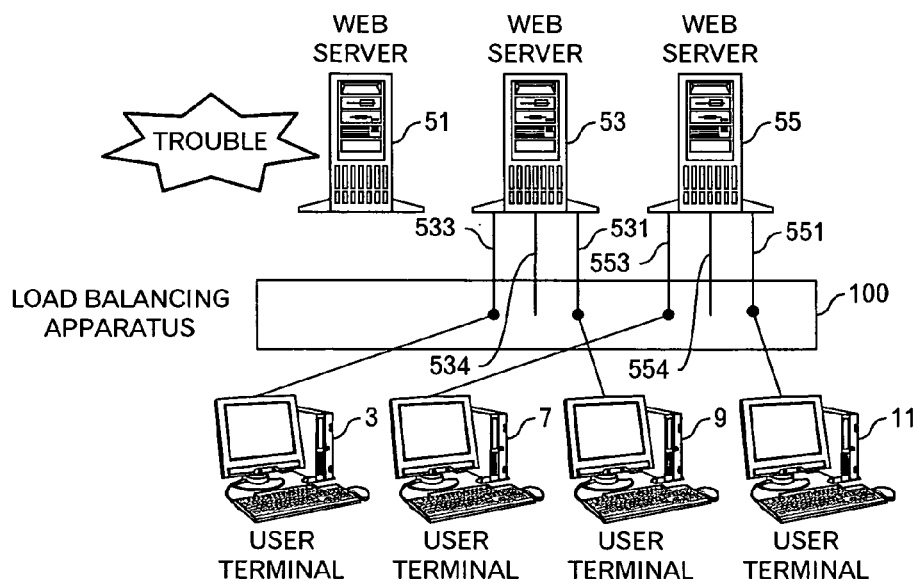
FIG. 2E is a fifth connection conceptual diagram.

FIG. 2E shows the fifth connection conceptual diagram. FIG. 2E shows a connection conceptual diagram in a case where in the connection state as shown in FIG. 2D, any trouble is detected in the Web server 51, and the server side connection is reset. Incidentally, as for the same elements as in FIG. 2D, the same symbols are affixed.

FIG. 2E shows a state in which a connection from the user terminal 3 is associated with the connection 533, which was already established and was not used, from the load balancing apparatus 100 to the Web server 53, and a connection from the user terminal 7 is associated with the connection 553, which was already established and was not used, from the load balancing apparatus 100 to the Web server 55. Incidentally, data for the connections 511 and 512, which were shown in FIG. 2D, disappears because the trouble occurs in the Web server 51. Thus, by associating the connections from the user terminals 3 and 7 associated with the Web server 51 in which the trouble was detected, with the connections to other Web servers, which were already established and were not used, it becomes possible not to affect the user terminals any influence due to the server trouble.

In a case of a state as shown in FIG. 2E, data as shown in FIG. 3F is stored in the connection management table 160, for example. That is, the bold frame portion is automatically updated from FIG. 3E, and the records for the user terminals 3 and 7 are not deleted. As for updated contents, data in the fifth line of FIG. 3E moved to the first line of the FIG. 3F, and data in the sixth line of FIG. 3E moves to the second line of FIG. 3F. Incidentally, in such an updating processing of the connection management table 160, it is possible to delete the record for the user terminal associated with the Web server in which the trouble is detected, once, and to register the deleted data again.

As described above, in this embodiment, when detecting any trouble in the Web server, by realizing either one of three kinds of resetting states as shown in FIGS. 2B, 2C and 2E, any influence due to the server trouble is not affected to the user terminals. Incidentally, the connection resetting methods in this embodiment mean three methods causing three kinds of connection resetting states as shown in FIGS. 2B, 2C and 2E. That is, the connection resetting method in the state shown in FIG. 2B is a method utilizing the new connection, the connection resetting method in the state shown in FIG. 2C is a method utilizing the existing and being used connection, and connection resetting method in the state shown in FIG. 2E is a method utilizing the exiting and not-used connection.

A processing of the load balancing apparatus 100 shown in FIG. 1 will be explained by using FIGS. 4 to 6. Here, selection of the connection resetting method, that is, a processing to determine to which state of three kinds of resetting states shown in FIGS. 2B, 2C and 2E the connection is reset is mainly explained.

Figure 4:
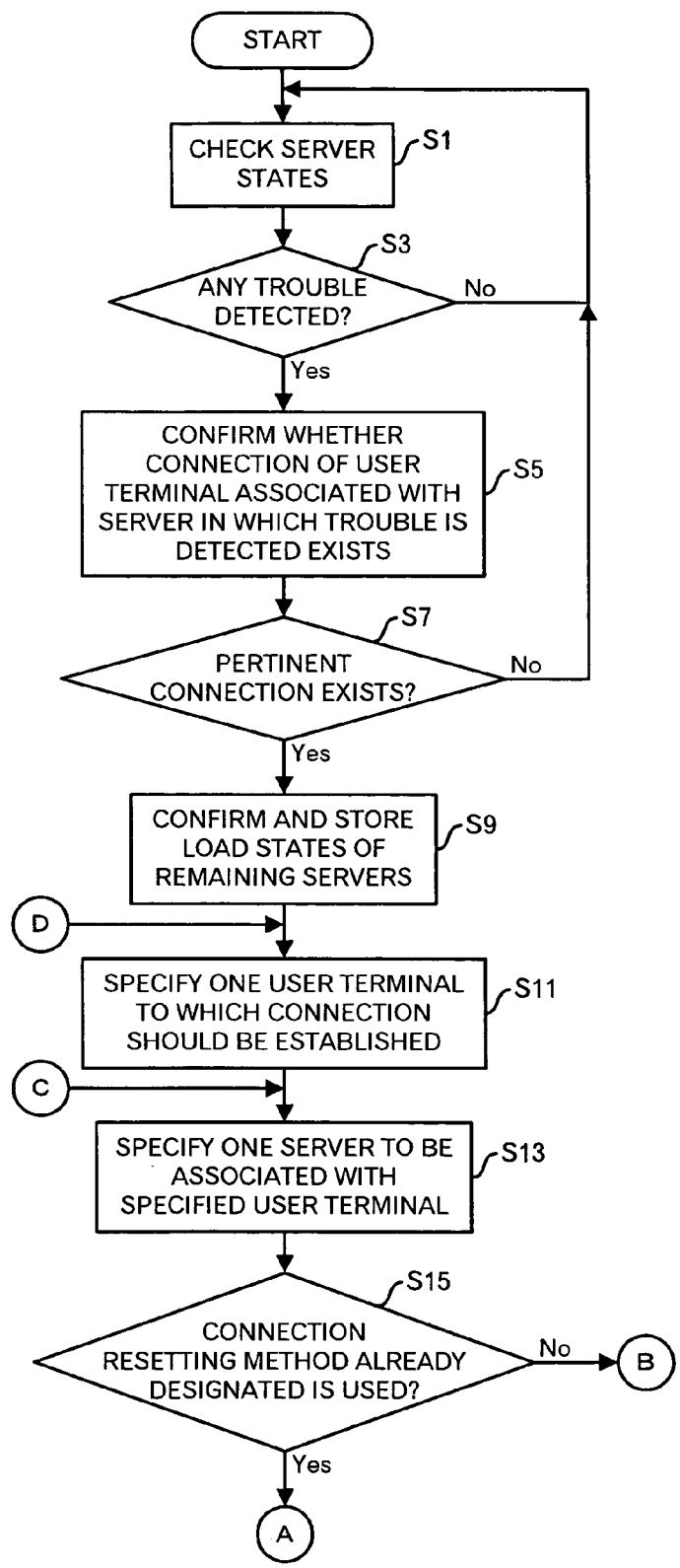
FIG. 4 is a first diagram showing a processing flow in an embodiment of this invention.

First, the server monitor 110 of the load balancing apparatus 100 carries out state checks of the Web servers 51, 53 and 55 at predetermined intervals or at an arbitrary timing, and stores the check results into the server state storage 140 (step S1 in FIG. 4). The state checks of the servers includes confirmation of the ping response, confirmation of the connection establishment, confirmation of the application operations or the like, and at least either of these is carried out. Incidentally, the state checks includes the check of the load state of each Web server in addition to the check of whether it is normal or abnormal, and the result of the checks are stored in the server state storage 140.

Then, the server monitor 110 judges whether or not any trouble in any Web server is detected (step S3). In a case where it is judged that no trouble of the Web server is detected (step S3: No route), the processing returns to the step S1. On the other hand, in a case where it is judged that any trouble of the Web server is detected (step S3: Yes route), the connection manager 120 of the load balancing apparatus 100 refers to the connection management table 160, and confirms whether or not connections of the user terminals associated with the Web server in which the trouble is detected exist (step S5). Then, it judges whether or not the pertinent connection exists (step S7). For example, in a case where data shown in FIG. 3A is registered in the connection management table 160 and any trouble is detected in the Web server 51, the connections from the user terminals 3 and 7 are the pertinent connections.

In a case where the pertinent connection does not exist (step S7: No route), the processing returns to the step S1. On the other hand, in a case where the pertinent connection exists (step S7: Yes route), the connection manager 120 refers to the server state storage 140, confirms the load states of remaining Web servers, in which any trouble is not detected, and temporarily stores the confirmation result into a storage area or the like (step S9). In addition, the connection manager 120 specifies one user terminal to which a connection should be established (step S11). For example, the user terminal 3 is specified. Then, the connection manager 120 specifies one Web server to be associated with the specified user terminal (step S13). Incidentally, the Web server is specified according to a predetermined load balancing method. For example, the Web server 53 is specified.

Next, the connection manager 120 refers to the resetting method storage 150, and judges whether or not the connection resetting method, which has already been designated, is used (step S15). In this embodiment, if a connection resetting method (either of three kinds) has been registered in the resetting method storage 150, the connection resetting method is used as the connection resetting method, which has already been designated. Incidentally, the connection resetting method is registered in the resetting method storage 150 by a system administrator or the like. In a case where it is judged that the connection resetting method, which has already been designated, is used (step S15: Yes route), the processing shifts to a processing in FIG. 5 via a terminal A. On the other hand, in a case where it is judged that the connection resetting method, which has already been designated, is not used, the processing shifts to a processing in FIG. 6 via a terminal B. For example, in a case where any connection resetting method is not registered in the resetting method storage 150, it is judged that the connection resetting method, which has already been designated, is not used.

Figure 5:
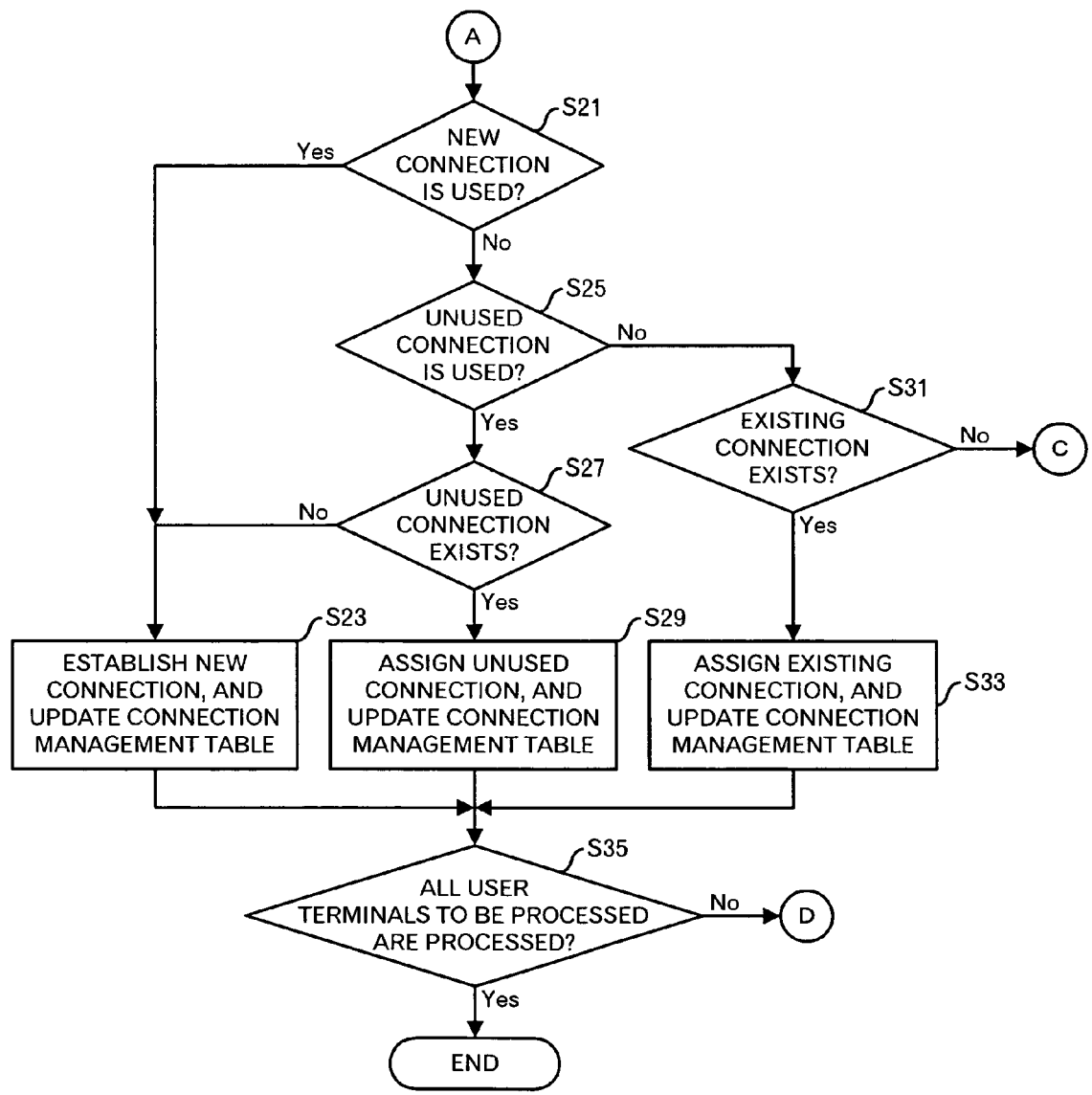
FIG. 5 is a second diagram showing the processing flow in the embodiment of this invention.

FIG. 5 shows a processing after the shift via the terminal A. First, the connection manager 120 judges whether or not the connection resetting method, which has already been designated, is "a method utilizing a new connection" (step S21 in FIG. 5). In a case where it is judged that "a method utilizing a new connection" is registered (step S21: Yes route), the connection manager 120 establishes a new connection, and updates the connection management table 160 (step S23). For example, a new connection like the connection 532 shown in FIG. 2B is established, and the connection management table 160 is updated to a state as shown in the first line of FIG. 3C. Then, the processing shifts to a step S35 described later. On the other hand, in a case where it is judged that the connection resetting method, which has already been designated, is not "a method utilizing a new connection" (step S21: No route), the connection manager 120 judges whether or not the connection resetting method is "a method utilizing an existing and unused connection" (step S25). In a case where "a method utilizing an existing and unused connection" is registered (step S25: Yes route), the connection manager 120 refers to the connection management table 160, and judges whether an existing and unused connection exists (step S27). In a case where data as shown in FIG. 3E is stored in the connection management table 160, based on data in the fifth and seventh lines for the Web server 53, for example, it is judged that the existing and unused connection exists.

In a case where it is judged that any existing and unused connection does not exist (step S27: No route), the processing shifts to the aforementioned step S23. On the other hand, in a case where it is judged that the existing and unused connection exists (step S27: Yes route), the connection manager 120 assigns the existing and unused connection to the specified user terminal and updates the connection management table 160 (step S29). For example, as shown in FIG. 2E, the user terminal 3 is assigned to the connection 533, which was an existing and unused connection, and the connection management table 160 is updated as shown in the first line of FIG. 3F. Then, the processing shifts to the step S35 described later.

On the other hand, in a case where it is judged that the connection resetting method, which has already been designated, is not "a method utilizing an existing and unused connection" (step S25: No route), the connection manager 120 refers to the connection management table 160, and judges whether or not any existing and being used connection exists (step S31). In a case where data as shown in FIG. 3A is stored in the connection management table 160, based on data in the third line for the Web server 53, for example, it is judged that the existing and being used connection exists.

In a case where it is judged that any existing and being used connection does not exist (step S31: No route), the processing shifts to the processing at the step S13 (FIG. 4) via a terminal C. On the other hand, in a case where it is judged that the existing and being used connection exists (step S31: Yes route), the connection manager 120 assigns the existing and being used connection to the specified user terminal, and updates the connection management table 160 (step S33). For example, as shown in FIG. 2C, the connection 531, which is an existing and being used connection, is assigned to the user terminal 3, and as shown in the first line of FIG. 3D, the connection management table 160 is updated.

Then, the connection manager 120 judges whether or not the processing has been carried out for all user terminals, which are objects of the connection resetting (step S35). In a case where it is not judged that the processing has been carried out for all user terminals to be processed (step S35: No route), the processing shifts to the processing at the step S11 (FIG. 4) via a terminal D. On the other hand, in a case where it is judged that the processing has been carried out for all user terminals to be processed (step S35: Yes route), the processing is completed.

In a case where the connection resetting method, which has already been designated, is followed, such a connection resetting is carried out.

Figure 6:
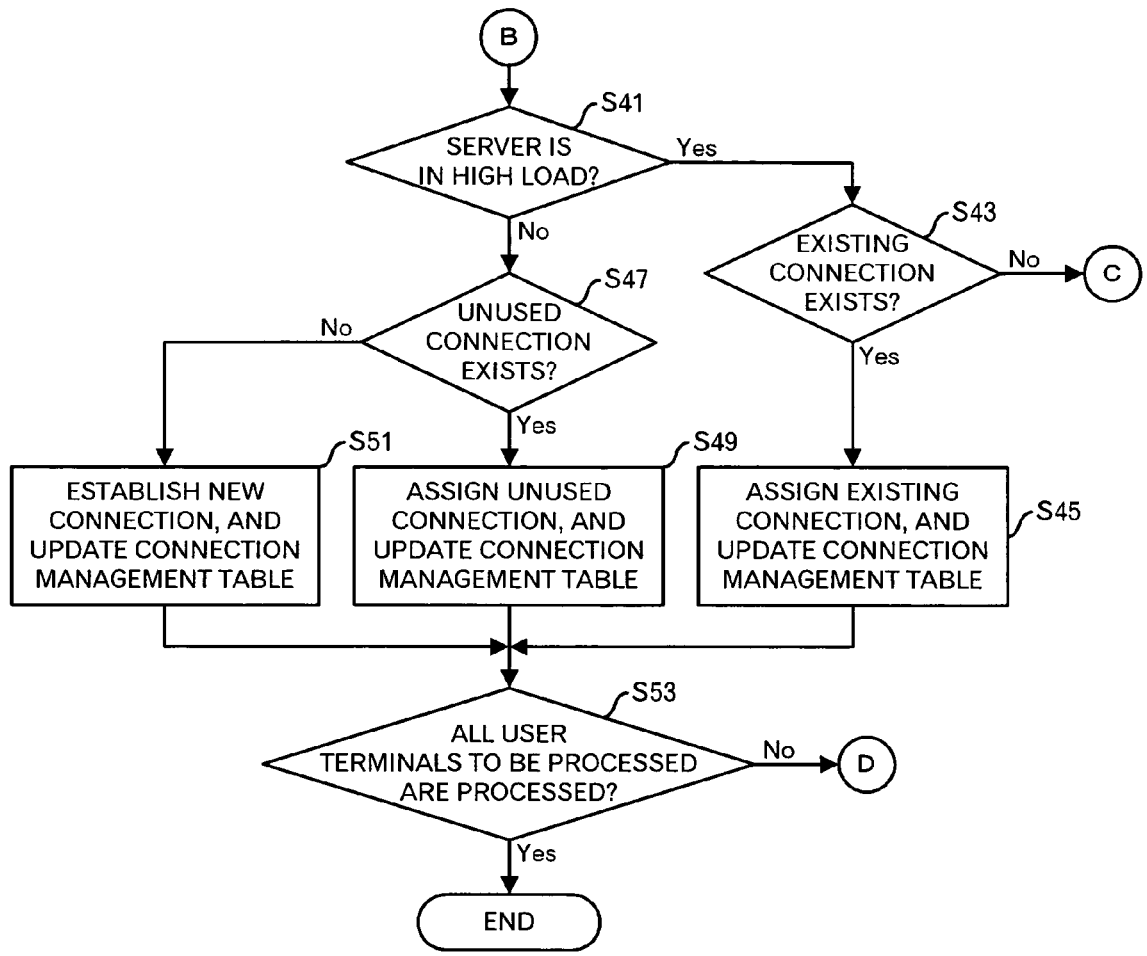
FIG. 6 is a third diagram showing the processing flow in the embodiment of this invention.

FIG. 6 shows a processing after the shift via the terminal B. First, the connection manager 120 refers to the server state storage 140, and judges whether or not the load of the specified Web server is higher than a predetermined reference (step S41 in FIG. 6). In a case where it is judged that the load of the Web server is high (step S41: Yes route), the connection manager 120 refers to the connection management table 160, and judges whether or not an existing and being used connection exists (step S43). In a case where any existing and being used connection does not exist (step S43: No route), the processing shifts to the processing at the step S13 (FIG. 4) via the terminal C. On the other hand, in a case where it is judged that the existing and being used connection exists (step S43: Yes route), the connection manager 120 assigns the existing and being used connection to the specified user terminal, and updates the connection management table 160 (step S45). For example, as shown in FIG. 2C, the connection 531, which is an existing and being used connection, is assigned to the user terminal 3, and as shown in the first line of FIG. 3D, the connection management table 160 is updated. Then, the processing shifts to step S53 described later.

On the other hand, in a case where it is judged that the load of the Web server is not high (step S41: No route), the connection manager 120 refers to the connection manager table 160, and judges whether or not any existing and unused connection exists (step S47). In a case where it is judged that the existing and unused connection exists (step S47: Yes route), the connection manager 120 assigns the specified user terminal to the existing and unused connection, and updates the connection management table 160 (step S49). For example, as shown in FIG. 2E, the user terminal 3 is assigned to the connection 533, which is an existing and unused connection, and as shown in the first line of FIG. 3F, the connection management table 160 is updated. Then, the processing shifts to a processing at the step S53 describe later.

On the other hand, in a case where it is judged that the existing and unused connection does not exist (step S47: No route), the connection manager 120 establishes a new connection, and updates the connection management table 160 (step S51). For example, a new connection like the connection 532 as shown in FIG. 2B is established, and the connection management table 160 is updated as shown in the first line of FIG. 3C.

Then, the connection manager 120 judges whether or not a processing has been carried out for all user terminals, which are objects of the connection resetting (step S53). In a case where it is judged that the processing has been carried out for all user terminals to be processed (step S53: No route), the processing shifts the processing at the step S11 (FIG. 4) via the terminal D. On the other hand, in a case where it is judged that the processing has been carried out for all user terminals to be processed (step S53; Yes route), the processing is completed.

In a case where the connection resetting method is not designated, as described above, the resetting of the connection is carried out according to the load states of the Web servers. That is, in a case where the load of the Web server is higher than a predetermined reference, a setting is carried out so as not to increase the number of connections, and in a case where the load of the Web server is equal to or lower than the predetermined reference, a setting is carried out so as to improve the response. As a result, in order not to affect the user terminals any influence due to the server trouble, the connection resetting is appropriately carried out.

Although an embodiment of this invention was explained as described above, this invention is not limited to this embodiment. For example, the table configurations shown in FIGS. 3A to 3F are mere examples, and it is possible to adopt another configuration to store similar data, and to add or delete items if necessary. In addition, the functional block diagram of the load balancing apparatus shown in FIG. 1 is a mere example, and it may be different from an actual program module configuration. In addition, the connection conceptual diagrams shown in FIGS. 2A to 2E are mere examples, and the similar contents may be represented in another mode. Furthermore, the processing flows shown in FIGS. 4 to 6 are also examples, and it is possible to rearrange the order of steps, and to add or delete any steps if necessary, as long as the similar processing result can be obtained.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A load balancing apparatus for transferring a processing request from a user terminal to either of a plurality of servers, comprising:
    a selector that selects, if it is detected that a trouble occurred in a first server included in said plurality of servers, a second server other than said first server from said plurality of servers as a new transfer destination of said processing request whose transfer destination is set to said first server;
    a generator that determines a specific connection that is one of a new connection and an already-established connection, to said second server, and generates and stores into a connection management data storage, without deleting data concerning a connection to said user terminal in said connection management data storage, setting data to transfer said processing request whose transfer destination is set to said first server to said second server via said specific connection; and
    a unit that transfers said processing request according to said setting data stored in said connection management data storage,
    wherein said connection management data storage stores data representing an association between a terminal-side connection to said user terminal and a server-side connection to either of said plurality of servers, and
    said generator generates said setting data including said new connection to said second server, as said server-side connection, in association with said terminal-side connection to said user terminal, when said specific connection is said new connection, and generates said setting data including said already-established connection to said second server, as said server-side connection, in association with said terminal-side connection to said user terminal, when said specific connection is said already-established server.

2. The load balancing apparatus as set forth in claim 1, wherein said already-established connection includes a first-type connection to said second server, which is already established and being used, and
    said generator determines said first-type connection to said second server, which is already established and being used, and generates said setting data including said first-type connection to said second server, as said server-side connection, in association with said terminal-side connection to said user terminal.

3. The load balancing apparatus as set forth in claim 1, wherein said already-established connection includes a second-type connection to said second server, which is already established and is not used, and
    said generator determines said second-type connection to said second server, which is already established and not used, and generates said setting data including said second-type connection to said second server, as said server-side connection, in association with said terminal-side connection to said user terminal.

4. The load balancing apparatus as set forth in claim 1, further comprising:
    a load state judging unit that judges load states of said plurality of servers, and
    wherein said generator determines, as said specific connection, a connection to said second server, which is already established and being used, in a case where said load state judging unit judges that a load of said second server is higher than a predetermined reference, and determines, as said specific connection, a connection to said second server, which is already established and is not used, in a case where said load state judging unit judges that said load of said second server is equal to or lower than said predetermined reference.

5. The load balancing apparatus as set forth in claim 1, further comprising:
    a load state judging unit that judges load states of said plurality of servers, and
    wherein said generator determines, as said specific connection, a connection to said second server, which is already established and being used, in a case where said load state judging unit judges that a load of said second server is higher than a predetermined reference, and determines, as said specific connection, a new connection to said second server in a case where said load state judging unit judges that said load of said second server is equal to or lower than said predetermined reference.

6. The load balancing apparatus as set forth in claim 1, wherein said generator determines, as said specific connection, a connection to said second server, which is already established and is not used, in a case where said connection to said second server exists, and determines, as said specific connection, a new connection to said second server in a case where only a connection being used in connections to said second server, which is already established.

7. The load balancing apparatus as set forth in claim 1, further comprising:
a load state judging unit that judges load states of said plurality of servers, and
wherein said generator determines, as said specific connection, a first connection to said second server, which is already established and being used, in a case where said load state judging unit judges that a load of said second server is higher than a predetermined reference, determines, as said specific connection, a second connection to said second server, which is already established and is not used, in a case where said load state judging unit judges that said load of said second server is equal to or lower than said predetermined reference and said second connection exists, and determines, as said specific connection, a new connection to said second server, in a case where said load state judging unit judges that said load of said second server is equal to or lower than said predetermined reference and there are only connections being used in connections to said second server, which are already established.

8. A storage medium storing a load balancing program for causing a processor to transfer a processing request from a user terminal to either of a plurality of servers, said load balancing program comprising:
if it is detected that a trouble occurred in a first server included in said plurality of servers, selecting a second server other than said first server from said plurality of servers as a new transfer destination of said processing request whose transfer destination is set to said first server;
determining a specific connection that is one of a new connection and an already-established connection, to said second server, and generating and storing into a connection management data storage, without deleting data concerning a connection to said user terminal in said connection management data storage, setting data to transfer said processing request whose transfer destination is set to said first server to said second server via said specific connection; and
controlling transfer of said processing request according to said setting data stored in said connection management data storage,
wherein said connection management data storage stores data representing an association between a terminal-side connection to said user terminal and a server-side connection to either of said plurality of servers, and
said generating and storing comprises:
generating said setting data including said new connection to said second server, as said server-side connection, in association with said terminal-side connection to said user terminal, when said specific connection is said new connection; and
generating said setting data including said already-established connection to said second server, as said server-side connection, in association with said terminal-side connection to said user terminal, when said specific connection is said already-established server.

9. The storage medium as set forth in claim 8, wherein said already-established connection is a first-type connection to said second server, which already established and being used, and
said determining, generating and storing comprises determining said first-type connection to said second server, which is already established and being used, and generating said setting data including said first-type connection to said second server, as said server-side connection, in association with said terminal-side connection to said user terminal.

10. The storage medium as set forth in claim 8, wherein said already-established connection is a second-type connection to said second server, which is already established and is not used, and
said determining, generating and storing comprises: determining said second-type connection to said second server, which is already established and not used, and generating said setting data including said second-type connection to said second server, as said server-side connection, in association with said terminal-side connection to said user terminal.

11. The storage medium as set forth in claim 8, said load balancing program further comprising:
judging load states of said plurality of servers, and
wherein said determining, generating and storing comprises:
determining, as said specific connection, a first connection to said second server, which is already established and being used, in a case where it is judged in said judging that a load of said second server is higher than a predetermined reference;
determining, as said specific connection, a second connection to said second server, which is already established and is not used, in a case where it is judged in said judging that said load of said second server is equal to or lower than said predetermined reference and said second connection exists; and
determining, as said specific connection, a new connection to said second server, in a case where it is judged in said judging that said load of said second server is equal to or lower than said predetermined reference and there are only connections being used in connections to said second server, which are already established.

12. A load balancing method for transferring a processing request from a user terminal to either of a plurality of servers, said load balancing method comprising:
if it is detected that a trouble occurred in a first server included in said plurality of servers, selecting a second server other than said first server from said plurality of servers as a new transfer destination of said processing request whose transfer destination is set to said first server;
determining a specific connection that is one of a new connection and an already-established connection, to said second server, and generating and storing into a connection management data storage, without deleting data concerning a connection to said user terminal in said connection management data storage, setting data to transfer said processing request whose transfer destination is set to said first server to said second server via said specific connection; and
transferring said processing request according to said setting data stored in said connection management data storage,
wherein said connection management data storage stores data representing an association between a terminal-side connection to said user terminal and a server-side connection to either of said plurality of servers, and said generating and storing comprises:

generating said setting data including said new connection to said second server, as said server-side connection, in association with said terminal-side connection to said user terminal, when said specific connection is said new connection; and generating said setting data including said already-established connection to said second server, as said server-side connection, in association with said terminal-side connection to said user terminal, when said specific connection is said already-established server.

* * * * *